Patented Sept. 27, 1949

2,483,374

UNITED STATES PATENT OFFICE 2,483,374

PARTIALLY DEPOLYMERIZING VINYL ETHER POLYMERS

Calvin E. Schildknecht, Easton, Pa., assignor to General Aniline & Film Corporation, New York, N. Y., a corporation of Delaware No Drawing. Application March 2, 1945, Serial No. 580,715

1 Claim. (Cl. 260—45.8)

This invention relates to a process of partially depolymerizing stabilized, flexible, form-stable vinyl ether polymers of high molecular weight and viscosity to obtain flexible, form-stable vinyl ether polymers of lower molecular weight and viscosity and increased tack and plasticity. The process has particular application to the preparation of flexible, form-stable polymers suitable for use in or as adhesive bases in the manufacture of flexible bond adhesive, i. e., flexible, form-stable polymers of intrinsic viscosity within the range of about 2 to 10 at 25° C. Ostwald-Fenske (1 gram solution of the polymer in 100 ml. of benzene).

The flexible, form-stable, high molecular weight and viscosity vinyl ether polymers are unstable to heat and in the presence thereof undergo partial depolymerization or breakdown in molecular weight to polymers of lower molecular weight and viscosity, eventually to semisolid or viscous liquid bodies and the alcohol from which the vinyl ether monomer was prepared. To maintain the valuable rubber-like, extensible character of these polymers, small amounts of an agent retarding the depolymerization are incorporated therein, as suggested in British Patent No. 482,512.

The present invention is concerned with the partial depolymerization of flexible, form-stable, high molecular weight and viscosity vinyl ether polymers which are rendered stable to depolymerization on heating at 50° C. for 10 hours by means of between about .05% and about 0.2% by weight of an air-oxidation-stable agent retarding depolymerization. Retarding agents stable to air oxidation may be found, for example, among the aromatic amines, more particularly the primary and secondary aromatic amines, the nitrogen-containing aromatic hydroxy compounds, the thioamides, the organic polysulfides, the alkali metal and alkaline earth metal sulfides and polysulfides, and finely divided sulfur. Specific examples of suitable air-oxidation-stable agents retarding depolymerization are: beta-naphthylamine, phenyl-beta-naphthylamine, ethyl-alpha-naphthylamine, 4, 4'-diaminodiphenyl aniline, p-hydroxphenyl morpholine (U. S. P. 2,156,380), thiourea, allyl polysulfide, benzyltetrasulfide, sodium sulfide and sodium polysulfide, rubber makers' and colloidal sulfur, and the like. The use of thiourea as a stabilizing agent is described in my copending application Serial No. 569,653, filed December 23, 1944; of the alkali metal and alkaline metal sulfides and polysulfides in my copending application Serial No. 569,654, filed December 23, 1944, now U. S. P. 2,395,684; and of finely divided sulfur in my copending application Serial No. 574,199, filed January 23, 1945. As the process of the present invention involves employing an organic peroxide, the treatment of polymers stabilized with an agent which undergoes air oxidation at room temperature, such as p-amino phenol, is not contemplated.

According to the present invention, the process of partially depolymerizing flexible, form-stable, high molecular weight and viscosity vinyl ether polymers stabilized in the manner and to the extent defined above, is carried out by heating the high polymer at a temperature between 50° C. and 100° C. in the presence of a small amount of an organic peroxide and interrupting the process at the desired viscosity or plasticity in the polymer while it is still of flexible, form-stable character, e. g., at an intrinsic viscosity between about 2 to 10, by incorporating therein stabilizing amounts of an air-oxidation-stable agent retarding depolymerization.

The amount of the organic peroxide employed, which is believed to assist the depolymerizing action of heat by cracking of the chain of the polymer, will vary depending upon the stability or resistance of the particular polymer. In general, from about 0.1% to about 2% by weight of the organic peroxide e. g., benzoyl peroxide, acetyl peroxide, lauroyl peroxide, etc., will be sufficient to promote the necessary breakdown in the polymer.

The process may be carried out by working the organic peroxide with the high polymer on a rubber mill or in a Werner-Pfleiderer machine, suitably heated. The temperature at which the high polymer is worked, and the length of the working will depend upon its stability and the degree of reduction in viscosity or increase in plasticity desired therein, the polymers varying in respect to the lower limit of viscosities at which they still retain their flexible, form-stable character. After the organic peroxide has been dispersed in the polymer, working of the mixture by milling, on heated-rolls, for example, is continued until the desired degree of viscosity or plasticity therein has been attained which generally may be arrived at in a ten to fifteen minute over-all milling period. The depolymerization is then interrupted by mixing the polymer under about the same temperature conditions with sufficient of an air-oxidation-stable retarding agent to stabilize it. The amount of retarding agent to be added will vary with the particular polymer, stabilization generally being attained by the addition of between about 0.5 and 2% of the agent.

The process may be practiced for obtaining flexible, form-stable polymers in which the degree of viscosity is the controlling factor, or on the other hand, it may be applied for the preparation of flexible, form-stable polymers exhibiting certain degrees of plasticity. In either event, reduction in viscosity and increase in tack of the polymer will occur.

The viscosity of the polymer undergoing partial depolymerization may be controlled by breaking off the milling or other form of working at appropriate intervals, removing the whole of the polymer from the mill or other machine on which it is being worked, quickly cooling it down to a temperature below 50° C., and determining the viscosity of the worked polymer in an Ostwald-Fenske viscometer at 25° C., using a 1 gram sample of the polymer dissolved in 100 ml. of benzene. In like manner, the polymer may be sampled at intervals for controlling the plasticity thereof. Plasticity determinations may be made on pellets of the worked polymer in a Williams plastometer following the method described in "Modern Plastics" for August 1944, page 27, flow-height measurements being made at 100° F.

In the present specification and claim, the term viscosity and numerical values therefor refer to the intrinsic viscosity of the polymers as determined in an Ostwald-Fenske viscometer at 25° C. on a 1 gram sample of the polymer dissolved in 100 ml. of benzene.

The process of the present invention is further illustrated by the following specific example to which, however, it is not to be limited and in which parts are by weight.

*Example*

2% of benzoyl peroxide was mixed with a quantity of a flexible, form-stable, high molecular weight polyvinyl isopropyl ether of intrinsic viscosity 16, the polymer containing 0.1% of p-hydroxyphenyl morpholine, on a two-rubber mill, the rolls of which were heated by circulating liquid at 50° C. Dispersion of the benzoyl peroxide was effected in a few minutes and milling continued for an additional 10 minutes. The sheeted polymer was quite tacky, had increased plasticity and an intrinsic viscosity of 4. The polymer was then stabilized by milling in at the same temperature conditions 1% of p-hydroxyphenyl morpholine to give a material suitable for use in adhesive bases for the manufacture of pressure-sensitive adhesives.

In like manner, following the procedure of the foregoing example, any of the higher molecular weight and viscosity, flexible, form-stable polymers of the vinyl ethers, for example, of vinyl n-butyl ether, vinyl isobutyl ether, etc., or of mixtures of vinyl ethers, for example, vinyl-n-butyl ether and vinyl isobutyl ether in the proportion of about 2 to 1, etc., may be partially depolymerized to flexible, form-stable polymers of lower molecular weight and viscosity and increased tack and plasticity, care being taken to observe the limiting lower viscosity for a particular polymer at which it still retains flexible and form-stable character. The term vinyl ether polymer as used herein and in the claim is intended to embrace the individual polymers or mixtures thereof and the copolymers, as defined above.

As previously mentioned, the process has particular application to the preparation of flexible, form-stable vinyl ether polymers suitable for the manufacture of flexible bond adhesives. The polymers of intrinsic viscosity within the range of about 2 to 10 meet the requirements of flexibility, form stability, plasticity and tack necessary in adhesive bases employed in making up flexible bond adhesives. The viscosity levels at which the individual polymers exhibit these valuable properties will vary within the aforementioned viscosity range, depending on the particular polymer. Flexible bond adhesives of the permanent type, that is, those employed like rubber cements, may be prepared by dissolving the polymer in a suitable volatile organic solvent, such as benzene, carbon tetrachloride, etc., in the proportions of about 1 to 10. For the temporary type of flexible bond adhesive, e. g., pressure-sensitive adhesives, the polymer is usually blended with a soft lower vinyl ether polymer of greater tack and the blend mixed with a modifier or plasticizer, such as hydrogenated ester gum, dibutyl sebacate or dioctyl phthalate, etc., to impart to the adhesive base the quality of being easily removed from the attached surface without injury to the latter. In some instances the flexible, form-stable polymer may itself possess sufficient tack to constitute the adhesive base.

Alternatively, the partial depolymerization of the stabilized higher molecular weight and viscosity, flexible, form-stable vinyl ether polymers may be carried out by dissolving the polymer in a suitable volatile organic solvent therefor, for example, benzene, toluene, carbon tetrachloride, methylethyl ketone, etc., adding the organic peroxide thereto and mixing to effect a thorough dispersion therein. The solvent is then evaporated from the mixture, cast in film form, by heating at about 50° C. at atmospheric or subatmospheric pressures, to regain the polymer as a flexible, form-stable body containing the dispersed organic peroxide. The polymer film with its contained organic peroxide is then heated to effect the desired change in the viscosity or plasticity thereof, observing the lower limit of viscosity for the retention of flexible and form-stable character in the particular polymer. The temperature of the heating and the length thereof will vary as previously mentioned. In general, the desired reduction in viscosity or increase in plasticity may be effected by heating the polymer at 80° C. for about 1 hour using about 0.2% by weight of one of the more active organic peroxides, for example, benzoyl peroxide or lauroyl peroxide, etc.

High molecular weight and viscosity, flexible, form-stable, i. e., rubberlike, extensible vinyl ether polymers may be prepared as described in my copending application Serial No. 574,199, filed January 23, 1945 and in the aforesaid U. S. Patent No. 2,395,684.

I claim:

A process of partially depolymerizing a flexible, form-stable, high molecular weight and viscosity polyvinyl isopropyl ether of intrinsic viscosity 16 containing 0.1% of p-hydroxyphenyl morpholine, which comprises milling the polymer with 2% of benzoyl peroxide at a temperature between 50° C. and 100° C. and interrupting the process when the intrinsic viscosity of the polymer is 4 by milling into the polymer at a temperature between 50° C. and 100° C. 1% of p-hydroxyphenyl morpholine.

CALVIN E. SCHILDKNECHT.

REFERENCES CITED

The following references are of record in the file of this patent:

UNITED STATES PATENTS

| Number | Name | Date |
|---|---|---|
| 2,050,843 | Jacobson | Aug. 11, 1936 |

FOREIGN PATENTS

| Number | Country | Date |
|---|---|---|
| 698,614 | Germany | Nov. 14, 1940 |